(12) United States Patent
Wilhelm

(10) Patent No.: US 8,150,729 B2
(45) Date of Patent: Apr. 3, 2012

(54) METHOD, SYSTEM AND PROGRAM PRODUCT FOR DISPLAYING ADVERTISING CONTENT ON A MUSIC PLAYER

(75) Inventor: Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 12/115,024

(22) Filed: May 5, 2008

(65) Prior Publication Data

US 2009/0276313 A1 Nov. 5, 2009

(51) Int. Cl.
*G06Q 40/00* (2012.01)

(52) U.S. Cl. ............. 705/14.1; 705/14; 705/26; 705/27; 705/23; 705/44

(58) Field of Classification Search ............ 705/14, 705/15–45
See application file for complete search history.

(56) References Cited

U.S. PATENT DOCUMENTS

| | | |
|---|---|---|
| 6,084,628 A | 7/2000 | Sawyer |
| 6,311,194 B1 | 10/2001 | Sheth et al. |
| 6,453,347 B1 | 9/2002 | Revashetti et al. |
| 6,487,538 B1 | 11/2002 | Gupta et al. |
| 6,513,052 B1 | 1/2003 | Binder |
| 6,611,842 B1 | 8/2003 | Brown |
| 6,615,175 B1 | 9/2003 | Gazdzinski |
| 6,718,551 B1 | 4/2004 | Swix et al. |
| 6,771,290 B1 | 8/2004 | Hoyle |
| 6,775,842 B1 | 8/2004 | Van Gestel |
| 6,799,201 B1 | 9/2004 | Lee et al. |
| 6,804,659 B1 | 10/2004 | Graham et al. |
| 6,850,252 B1 | 2/2005 | Hoffberg |
| 6,856,673 B1 | 2/2005 | Banks et al. |
| 2002/0094787 A1* | 7/2002 | Avnet et al. ............. 455/68 |

(Continued)

FOREIGN PATENT DOCUMENTS

WO WO 2007/115780 A1 10/2007

OTHER PUBLICATIONS

"Net Worthy; Final Edition", Mark Stachiew, The Ottawa Citizen, Ottawa, Ont.: Jun. 14, 2007, p. F.8.*

(Continued)

*Primary Examiner* — Ella Colbert
*Assistant Examiner* — Hai Tran
(74) *Attorney, Agent, or Firm* — Arthur J. Samodovitz (57) ABSTRACT

A method, system and program product for displaying advertising content on a portable music player. A method, system and program product for displaying advertising content on a portable music player based on content stored therein. The method includes checking in a meta tag for a music file being downloaded whether a URL corresponding to a content file containing advertising content associated with the music file being downloaded is specified therein. If a URL is specified, automatically connecting to the URL to download the content file associated with the music file being downloaded, and displaying, on the display of the music player, relevant content of the advertising content downloaded to the music player, where the advertising content downloaded includes at least one of: advertising related to a music file downloaded, advertising related to a music file stored on the music player, additional general information related to the music file downloaded, and additional general information related to a music file stored on the music player.

20 Claims, 8 Drawing Sheets

U.S. PATENT DOCUMENTS

| | | |
|---|---|---|
| 2003/0101451 A1 | 5/2003 | Bentolila et al. |
| 2003/0191689 A1 | 10/2003 | Bosarge et al. |
| 2004/0120688 A1 | 6/2004 | Poltorak |
| 2004/0186777 A1 | 9/2004 | Margiloff et al. |
| 2005/0080775 A1 | 4/2005 | Colledge et al. |
| 2006/0123053 A1 | 6/2006 | Scannell, Jr. |
| 2006/0173974 A1* | 8/2006 | Tang .............................. 709/217 |
| 2007/0033531 A1* | 2/2007 | Marsh ........................... 715/738 |
| 2007/0073596 A1 | 3/2007 | Alexander et al. |
| 2007/0162395 A1 | 7/2007 | Ben-Yaacov et al. |
| 2007/0226260 A1* | 9/2007 | Williams et al. ........... 707/104.1 |

OTHER PUBLICATIONS

Wikipedia, entry for "Digital Audio Player", printed Jun. 28, 2011, 8 pages.

* cited by examiner

METHOD, SYSTEM AND PROGRAM PRODUCT FOR DISPLAYING ADVERTISING CONTENT ON A MUSIC PLAYER

FIELD OF THE INVENTION

The invention relates to computer systems and software, and more specifically to an automated technique for displaying advertising content on a portable music player, the advertising content being relevant to or related to audio content stored therein.

BACKGROUND OF THE INVENTION

In today's competitive market, consumers are overloaded with information, regardless of whether it comes from television advertisements, radio, e-mail spam, cell phones, etc. Further, consumers do not have an easy way to identify and subscribe to available services and often do not have the ability to choose what information to receive and what information not to receive. In order for a service provider to compete successfully in this highly competitive market, a service provider not only needs to deliver the services, but also needs to provide services that are personalized to the consumer and more effective for the advertiser. As such, there is a need for innovative ways to provide services to consumers in a manner that is cost effective.

SUMMARY OF THE INVENTION

The invention resides in a method, system and program product for displaying advertising content on a portable music player. The method includes installing code on a computer system for displaying advertising content on a display of a portable music player. Further, the method includes checking in a meta tag for a music file being downloaded whether a URL corresponding to a content file containing advertising content associated with the music file being downloaded is specified therein. If a URL is specified, automatically connecting to the URL to download the content file associated with the music file being downloaded, and displaying, on the display of the music player, relevant content of the advertising content downloaded to the music player, where the advertising content downloaded includes at least one of: advertising related to a music file downloaded, advertising related to a music file stored on the music player, additional general information related to the music file downloaded, and additional general information related to a music file stored on the music player. In an embodiment, the displaying step further includes displaying the relevant advertising content while the respective music file is being played on the portable music player. The method further includes checking the respective URL, at pre-determined time intervals, for updates to the at least one content file, and updating the at least one content file downloaded to the portable music player. In an embodiment, the method includes configuring the portable music player to display the advertising content downloaded to the portable music player. Further, in an embodiment, the method includes analyzing data pertaining to one or more music files stored on the portable music player for determining which of the relevant content of the advertising content downloaded to the portable music player should be displayed on the display of the portable music player. In an embodiment, the analyzing data step further includes forwarding one or more user-defined preferences pertaining to the one or more music files stored on the portable music player to the URL when the portable music player is connected to the computer system, and receiving in response to the one or more user-defined preferences forwarded, the advertising content that is tailored based on the one or more user-defined preferences forwarded. In an embodiment, the analyzing data step further includes forwarding, to the URL when the portable music player is connected to the computer system, one or more listening habits logged for a user pertaining to the one or more music files stored on the portable music player, and receiving in response to the one or more listening habits logged for a user forwarded, the advertising content that is tailored based on the one or more listening habits forwarded. In an embodiment, the data analyzed includes at least one of: log records, specific preferences defined by a respective user, listening habits of a respective user, geographical information based on tracing IP address of the portable music player, track ratings of music files stored on the portable music player, number of times a respective music file is played on the portable music player, and a date and a time a respective music file is last updated.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. Reference will now be made in detail to the preferred embodiments of the invention.

Figure 1:
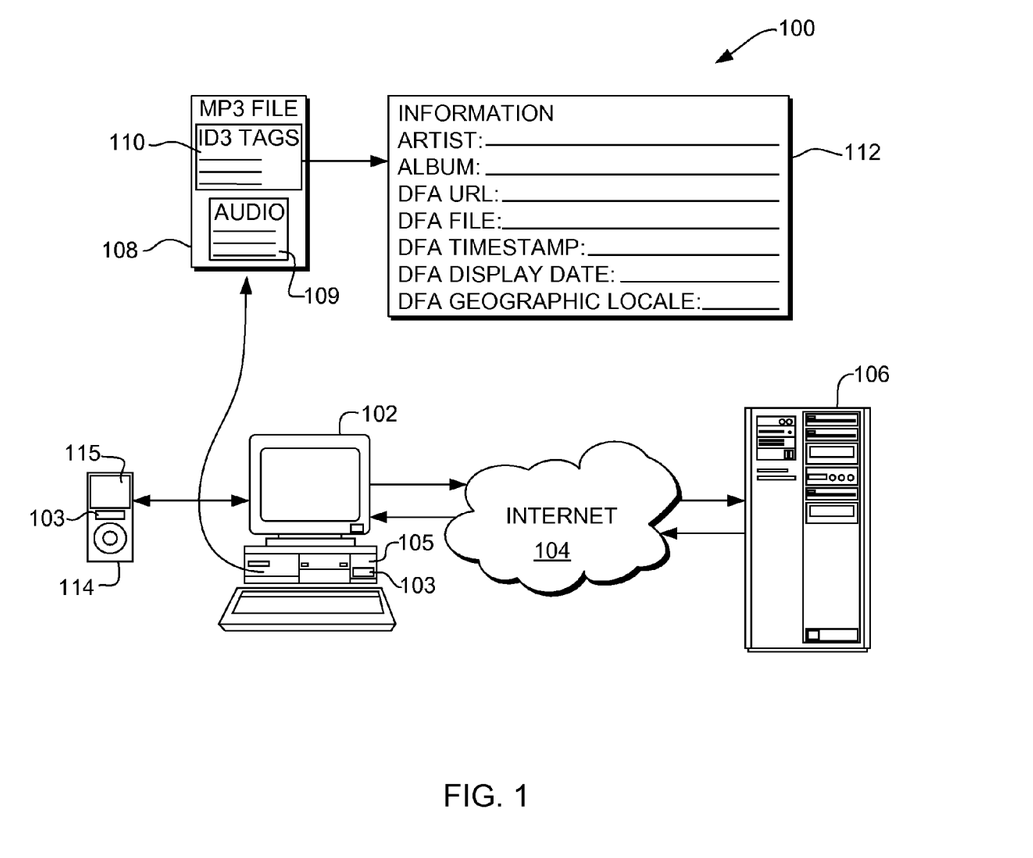
FIG. 1 is a schematic block system diagram illustrating an embodiment of a system that includes a computer coupled to a server via a network communications channel for displaying advertising content on a portable music player, in accordance with an embodiment of the invention.
Figure 2:
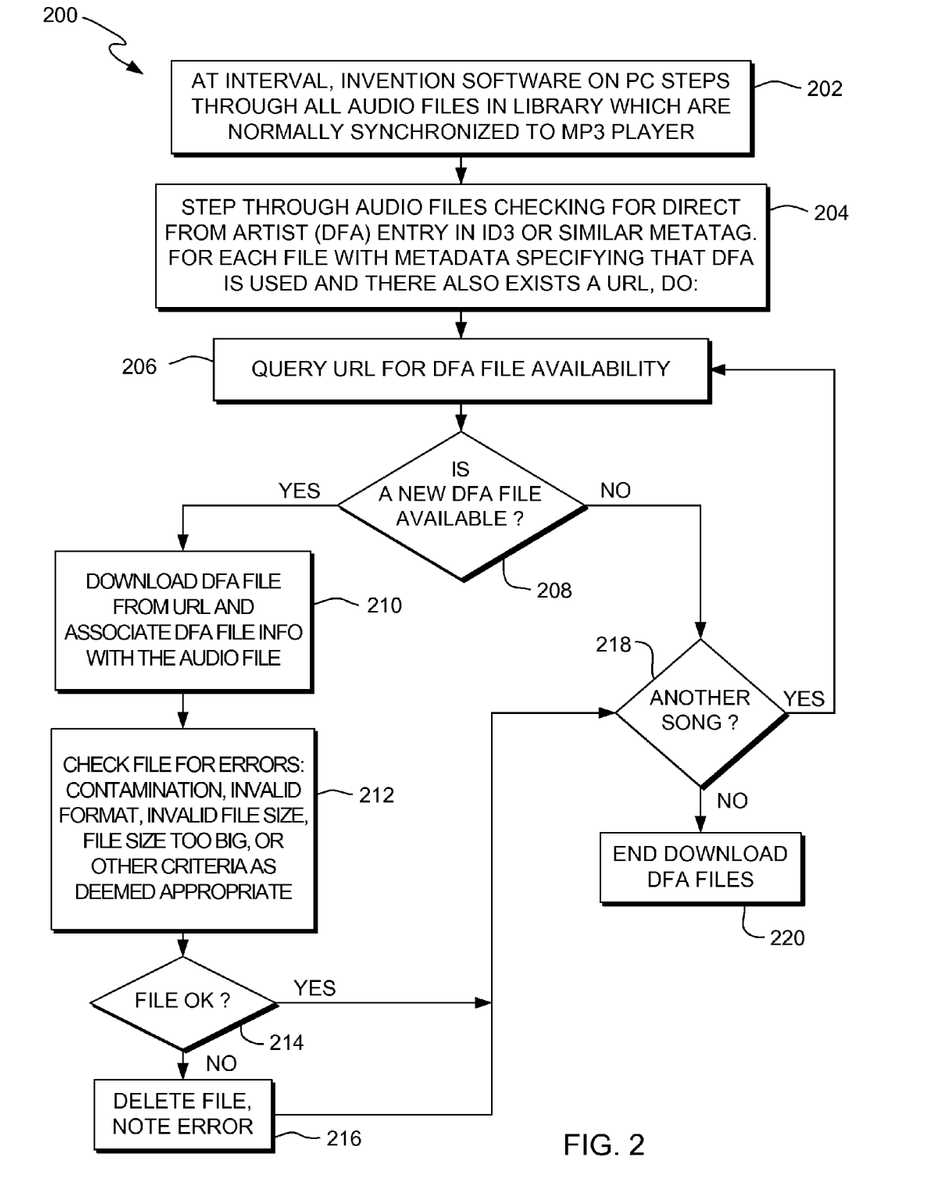
FIG. 2 is a flowchart depicting a method for downloading a Direct From Artist (DFA) file on to a personal computer having a DFA code for displaying advertising content on a portable music player, in accordance with an embodiment of the invention.

In one embodiment, the invention provides a system for displaying advertising content on a display of a portable music player or device, in accordance with an embodiment of the invention. Turning to FIG. 1, reference numeral 100 depicts a system for displaying advertising content, such as, advertising and/or other relevant information pertaining to either an audio selection playing on the portable music player or based on one or more audio selections stored on the portable music player or based on specific preferences or listening habits of the user of the portable music player, in accordance with an embodiment of the invention. A portable music player or device can be any device that is capable of communicating on a wired or wireless network, such as a Wi-Fi (Wireless Fidelity) capable MP3 player (MPEG-1 (Moving Pictures Experts Group) or any other playback hardware or software combination, which includes a display screen for displaying the advertising content, as discussed further herein below. In particular, as shown in FIG. 1, the system 100 comprises of a network 104, such as, the Internet, that provides a communications channel for one or more devices coupled to the network. As shown in the embodiment in FIG. 1, a standalone or personal computer (PC) 102, such as, a laptop 102 or a desktop, is coupled to the network 104. In an embodiment, the personal computer 102 has installed thereon, for instance, on a hard drive 105 of the personal computer 102, a program or code 103 referred to herein as the Direct From Artist (DFA) code or tool or software program for displaying advertising content on a display of a portable music player 114. Accordingly, MP3 Player 114 includes a computer-readable tangible storage device to store the DFA program code 103 and a processor to execute the DFA program code via a computer-readable memory. In an embodiment, the DFA code or software 103 is installed on the hard drive 105 of the personal computer system 102. Further, in an embodiment, the DFA code or software program 103 that provides the advertising functionality is installed on both the personal computer 102 and the portable music player 114, so that advertising content downloaded by the computer system 102 may be displayed on the portable music player 114. In an embodiment, the portable music player 114 comprises a music player that includes a display 115 for displaying advertising content, in accordance with the invention. Further, as shown in FIG. 1, the system for displaying advertising on a portable music player includes a server 106 that is also coupled to the network 104. In an embodiment, the server 106 is a server that hosts one or more Direct From Artist (DFA) files, also referred to herein as DFA information files. In an embodiment, a DFA information file contains information or content that an artist or band or company or advertiser or marketer wishes to convey. In an embodiment, the personal computer 102 contains a hard drive 105 that stores a digital music library on the hard drive 105, for instance, one or more MP3 audio or music files 108. Further, in an embodiment, as shown in FIG. 1, an MP3 file 108 comprises one or more meta tags, which in an embodiment, comprises one or more ID3 tags or similar meta tags. In an embodiment, the ID3 tag or similar meta tag may contain additional data, such as, artist name, album name, Direct From Artist (DFA) URL address, Direct From Artist (DFA) filename, Direct From Artist (DFA) time stamp, Direct From Artist (DFA) display date, and Direct From Artist (DFA) geographic locale. It is understood by one skilled in the art that other relevant information may be defined by the ID3 standard and may be included in the ID3 tags 110 contained within a MP3 file 108. Further, as shown in FIG. 1, the MP3 file 108 contains audio data 109.

Reference is now made to FIGS. 2 through 6, which together depict a method or process for collecting and displaying advertising content, such as, advertising and/or other relevant information pertaining to either an audio selection playing on the portable music player or based on one or more audio selections or files stored on the portable music player or based on specific preferences or listening habits of the user of the portable music player, in accordance with an embodiment of the invention. As discussed herein above, the Direct From Artist (DFA) code or software is installed on the personal computer. Accordingly, referring to reference numeral 200 in FIG. 2, the DFA code or software installed on the personal computer, at predetermined time intervals, checks or steps through all the audio files stored in a digital music library on the hard drive of the personal computer, in step 202. In an embodiment, the audio files in the personal computer are synchronized to a portable music player, such as, a MP3 player. In step 204, the DFA code or software checks for any Direct From Artist (DFA) entries contained within a meta tag, such as, the ID3 meta tag or a similar meta tag of a MP3 file or music file or audio file. For each audio file that contains meta data specifying that a Direct From Artist (DFA) file is used and that there exists a URL (Uniform Resource Locator), the DFA code performs steps 206 through 220, as discussed further herein below. In step 206, the DFA code queries the URL listed in the Direct From Artist (DFA) file listed in the ID3 tag to check the availability of the DFA information file. Further, in step 208, the DFA code determines whether or not a new DFA information file is available for download. If a new DFA information file is available for download, then in step 210 the DFA code downloads the DFA information file from the URL and further associates the information or content contained in the DFA information file with the audio file containing the meta data or meta tag specifying the DFA information file used. Further, in step 212, the DFA code checks the DFA information file for any errors, such as, contamination, invalid format, invalid file size, large file size, or any other error criteria as deemed appropriate. The DFA code determines in step 214 if the DFA information file is okay, that is, whether or not the DFA information file is free from errors. If the DFA information file is determined to be free from errors, the DFA code determines in step 218 whether or not there is another audio file or track or song listed in the audio files being checked on the personal computer. If there are no other audio tracks or songs listed, the DFA code ends the download of DFA information files in step 220. Going back to step 214, if the file is not free of errors, then the DFA code deletes in step 216 the DFA information file that was downloaded and notes the type of error in a file, for instance, in a log file. The process continues with step 218, with the DFA code determining whether or not there is another song listed in the audio files being checked on the personal computer. If there are no other audio tracks or songs listed, the DFA code ends the download of DFA information files in step 220. Accordingly, the method steps 206 through 220 are performed for each audio file stored in the music library of the personal computer.

Figure 3:
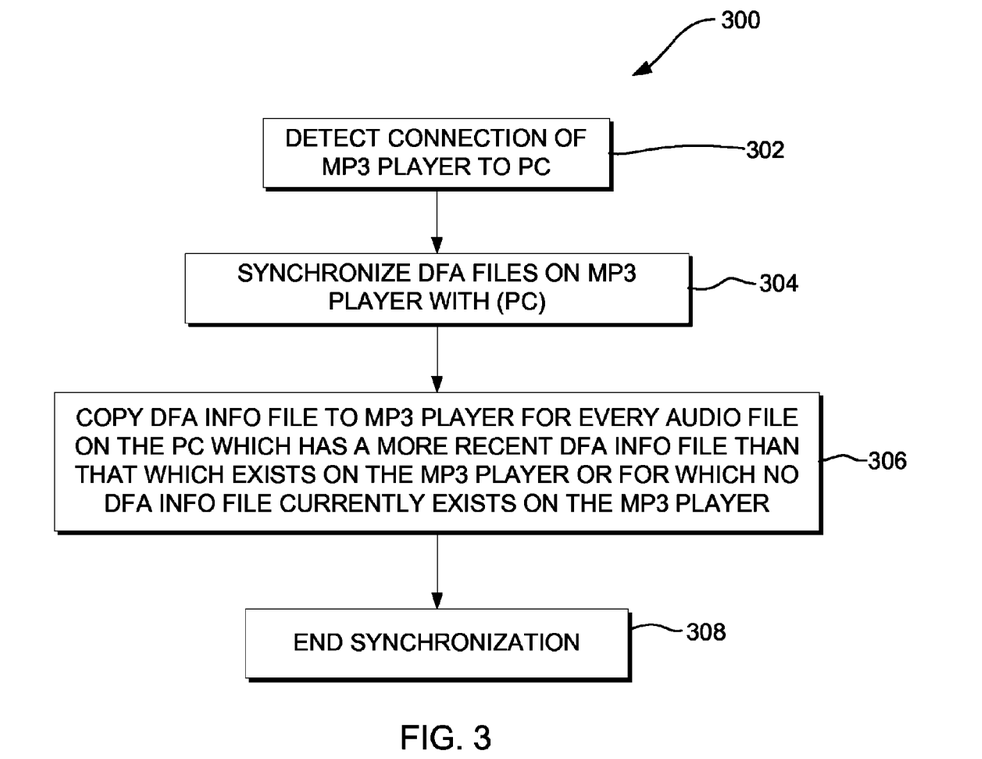
FIG. 3 is a flowchart depicting a method for synchronizing the Direct From Artist (Direct From Artist) files on the personal computer with the files on the portable music player, in accordance with an embodiment of the invention.

Turning to FIG. 3, reference numeral 300, outlines the steps of synchronizing a portable music player with the personal computer, where both the portable music player and the personal computer have installed thereon the DFA (Direct From Artist) code. In an embodiment, as described in FIG. 3, the synchronization of the DFA files on a MP3 player is a separate event from the synchronization of a music library on a personal computer with the music files on a MP3 player, which may be carried out utilizing a music file synchronization software. The synchronization of the DFA files on the personal computer with that of DFA files on the MP3 player is an additional synchronization routine, which performs synchronization of only the DFA files. It is understood by one skilled in the art that the synchronization of the DFA files may run prior to, parallel with, or after the synchronization of the music files. Turning to FIG. 3, accordingly, after the personal computer has downloaded each of the relevant DFA information files pertaining to one or more audio files found on the music library file within the personal computer, the DFA code on the personal computer in step 302 detects connection of a portable music player, such as, a MP3 player, to the personal computer. The DFA code synchronizes in step 304 the DFA files on the MP3 player with the DFA files on the personal computer. In step 306, the DFA code copies the relevant DFA information file downloaded on to the personal computer to the portable music player, such that, every audio file on the personal computer which has a more recent DFA information file than that which exists on the portable music player or for which no DFA information file currently exist on the portable music player is updated. The synchronization process for synchronizing the DFA files ends at step 308.

Figure 4:
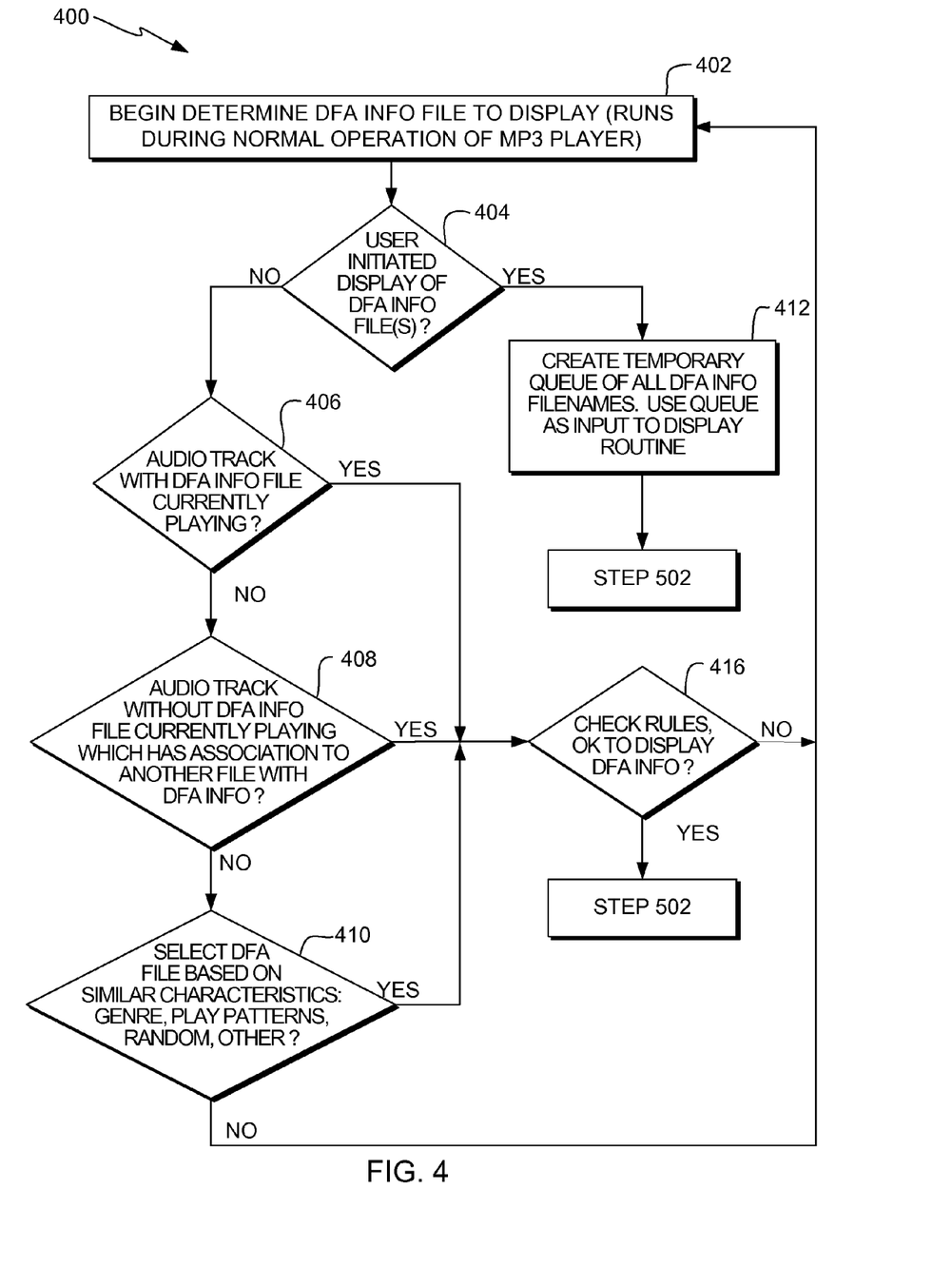
FIG. 4 is a flowchart depicting a method for displaying advertising content collected or downloaded from a Direct From Artist (DFA) file pertaining to an audio file on a portable music player, in accordance with an embodiment of the invention.

Turning to FIG. 4, reference numeral 400, outlines the steps of determining which DFA information file to display during operation of a portable music player, in accordance with an embodiment of the invention. In step 402, the Direct From Artist (DFA) code starts during normal operation of a portable music player. The Direct From Artist (DFA) code determines in step 404 whether or not the user has initiated display of the Direct From Artist (DFA) file(s). If the DFA code determines that the user has initiated display of the Direct From Artist (DFA) file(s), then the DFA code creates in step 412 a temporary queue of all the Direct From Artist file names and uses the queue as input to display information routine and continues with step 502, described further herein below with respect to FIG. 5. However, at step 404, if the DFA code determines that the user has not initiated display of the Direct From Artist (DFA) file(s), then the DFA code determines in step 406 whether or not an audio track with an associated DFA file is currently playing on the portable music player. If the DFA code determines that an audio track with an associated DFA file is not currently playing on the portable music player, then the DFA code determines in step 408 whether or not an audio track without a DFA file that is currently playing on the MP3 player has an association to another DFA file with DFA information. If the DFA code determines in step 406 that an audio track with an associated DFA file is currently playing on the portable music player or that the audio track without a specified DFA file is currently playing has an association to another DFA file with other DFA information, then the DFA code moves onto step 416. Further, if the DFA code determines in step 408 that the audio track that is currently playing has no DFA file and that further the audio track that is currently playing has no association to another DFA file with DFA information, then the DFA code determines in step 410 whether or not to select a DFA file based on similar genre, play patterns, randomly or based on some other criteria. If the DFA code determines in step 410 to not select a DFA file based on similar genre, play patterns, randomly or based on some other criteria, then the process returns to step 402. However, if the DFA code determines in step 410 to select a DFA file based on similar genre, play patterns, random or other criteria, then the DFA code moves onto step 416. In step 416, the DFA code checks rules to determine whether or not to display Direct From Artist information or content in the DFA file on the portable music player. If the DFA code determines that the rules indicate displaying the information contained in the DFA file, then the process continues at step 502, described further herein below in FIG. 5. If not, the process goes back to step 402.

Figure 5:
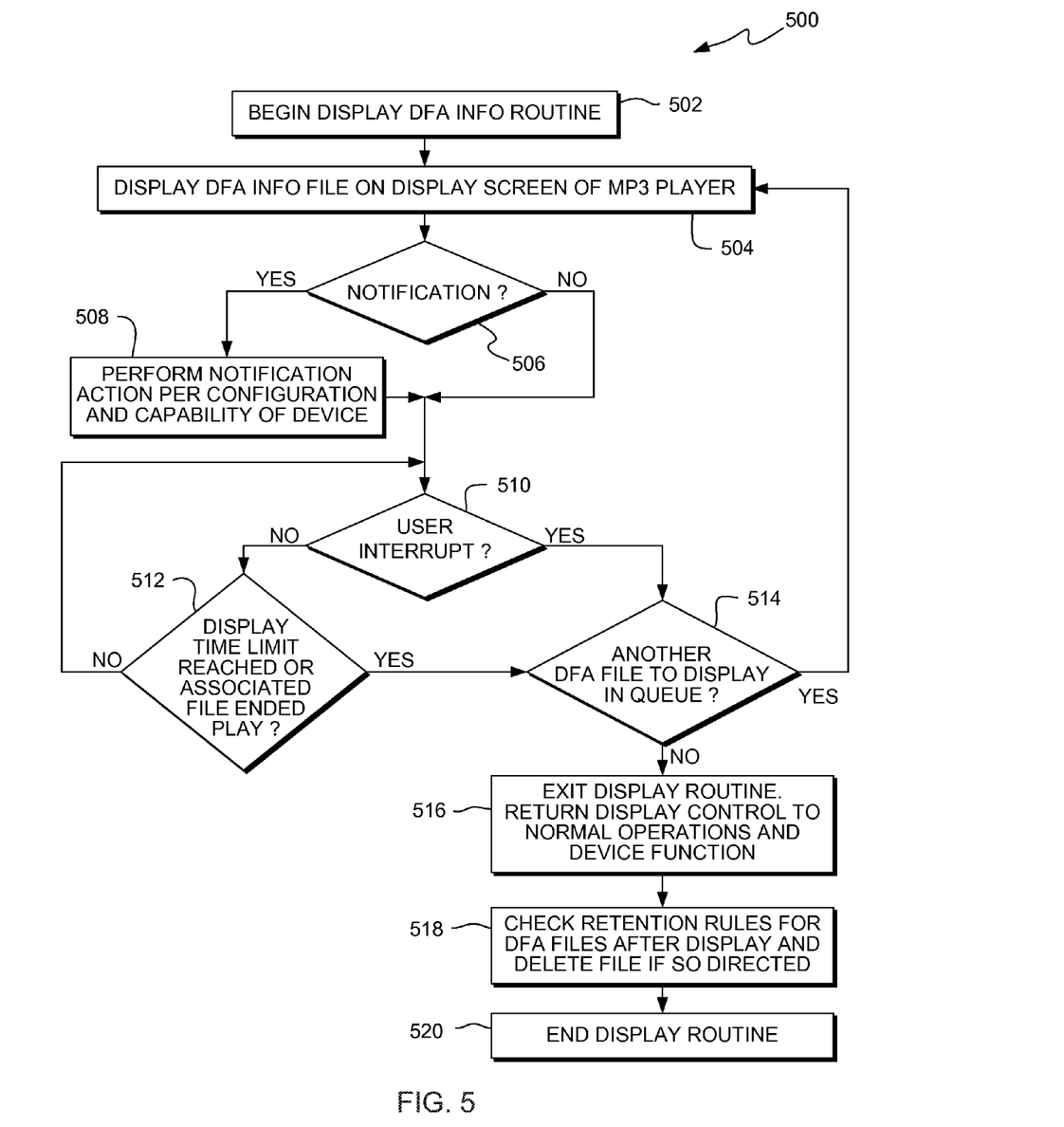
FIG. 5 is a flowchart depicting a method for displaying advertising content collected or downloaded from a Direct From Artist (DFA) file pertaining to an audio file on a portable music player, in accordance with an embodiment of the invention.

Turning to FIG. 5, reference numeral 500, depicts a method of displaying the Direct From Artist (DFA) information routine collected from the Direct From Artist file. In step 502, the DFA code begins the display Direct From Artist information routine. In step 504, the DFA code displays the Direct From Artist (DFA) information file on the display screen of a portable music player, such as, a MP3 player. In step 506, a determination is made as to whether or not a notification is issued. If a notification is issued, the DFA code performs in step 508 the notification action per configuration and capability of the device and moves on to step 510 and determines whether or not there has been a user interrupt. However, if in step 506, a notification is not issued, then the DFA code determines whether or not a user interrupt is detected in step 510. If the DFA code determines that a user interrupt is detected in step 510, then the DFA code determines whether or not there is another DFA file to display in the queue. However, back in step 510, if the DFA code determines that there has not been a user interrupt, then the DFA code determines whether or not the display time limit has been reached or the associated DFA file has ended play in step 512. If the DFA code determines that the display time limit has not been reached or that the associated DFA file has not ended play, then the DFA code goes back to step 510 and determines whether or not a user interrupt is detected. If the DFA code determines detection of a user interrupt, then the DFA code determines in step 514 whether or not there is another DFA file to display in the queue. Moreover, if the DFA code determines in step 512 that the display time limit has been reached or that the associated DFA file has ended play, then the DFA code determines in step 514 whether or not there is another DFA file to display in the queue. If the DFA code determines that there is another DFA file to display in the queue, then the method goes back to step 504 with the DFA code displaying the Direct From Artist (DFA) information file on the display screen of the MP3 player. However, in step 514, if the DFA code determines that there is not another DFA file to display in the queue, then the DFA code exits the display routine in step 516 and returns the display control to normal operations and device function. Further, in an embodiment, the DFA code in step 518 checks retention rules for Direct From Artist (DFA) files after they have been displayed and deletes one or more DFA files, if directed to do so by the retention rules, and ends the display routine at step 520.

Figure 6:
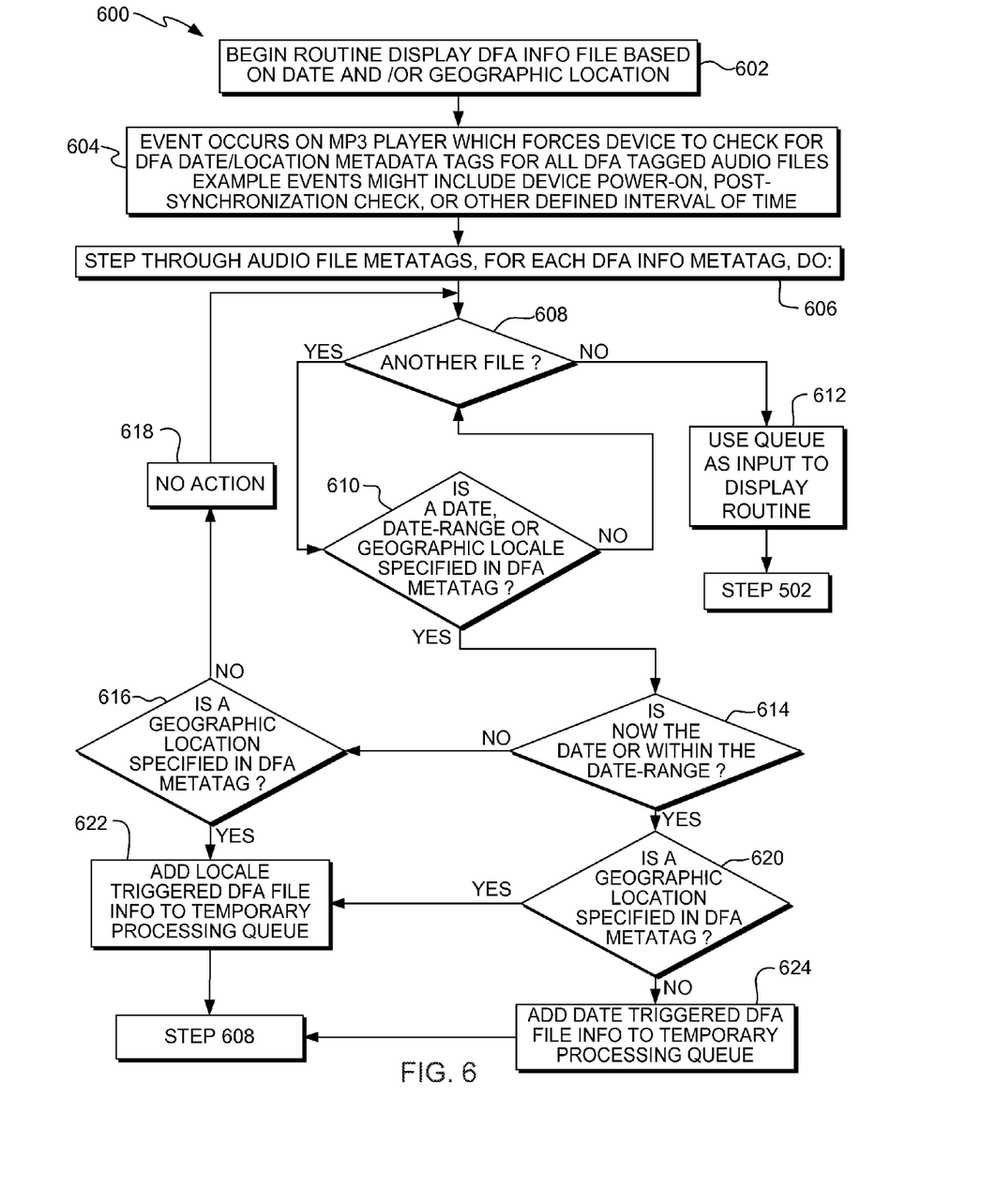
FIG. 6 is a flowchart depicting a method for displaying advertising content collected or downloaded from a Direct From Artist (DFA) file pertaining to an audio file on a portable music player during operation of the portable music player, in accordance with an embodiment of the invention.

Turning to FIG. 6, reference numeral 600, depicts a method for displaying Direct From Artist (DFA) information file based on date and/or geographic location. The method begins at step 602 with the DFA code beginning the routine for displaying Direct From Artist (DFA) files based on date and/or geographic location. In step 604, the DFA code detects that an event has occurred on the portable music player or MP3 player which has caused the MP3 player or device to check for Direct From Artist (DFA) date or location metadata tags for all DFA tagged audio files. For example, an event that triggers the portable music player to check for DFA date or location metadata tags may include device power on, post-synchronization check or a defined interval of time configured for the device. In step 606, the DFA code steps through the audio file metadata tags found on the portable music player and for each Direct From Artist (DFA) information meta tag found, the DFA code performs steps 608 through 626. In step 608, the DFA code determines whether or not there is another audio file. If there is not another DFA file, then the DFA code in step 612 uses queue as input to display the routine and proceeds to step 502 in FIG. 5 for displaying the DFA information file on the portable music player, as described herein above. However, in step 608, if there is another DFA file, then the DFA code determines in step 610 whether or not a date, date-range or geographic locale are specified in a DFA meta tag. If a date, date-range or geographic locale is not specified in a DFA meta tag, then the DFA code returns to step 608 to determine whether or not there is another DFA file. However, if in step 610, a date, date-range or geographic locale are specified in a DFA meta tag, then the DFA code determines in step 614 whether or not the date is now or within the date-range for displaying the DFA information file. If the DFA code determines in step 614 that the date is not now or not within the date-range, then the DFA code determines in step 616 whether or not a geographic location is specified in the DFA meta tag. If no geographic location is specified in the DFA meta tag, then the DFA code takes no action in step 618 and returns to step 608 to check whether or not there is another DFA file. Going back to step 614, if the DFA code determines that the date is now or within the date-range, then the DFA code determines in step 620 whether or not a geographic location is specified in the DFA meta tag. If a geographic location is not specified in the DFA meta tag, then in step 624, the DFA code adds the date triggered DFA file information to a temporary processing queue and goes back to step 608 to determine whether or not there is another DFA file. However, going back to step 616 and to step 620, if the DFA code determines that a geographic location is specified in the DFA meta tag, then in step 624, the DFA code adds the locale triggered DFA file information to a temporary processing queue in step 622 and goes back to step 608 to determine whether or not there is another DFA file, thus, repeating the steps 608 through 624, as necessary to display DFA information file based on date and/or geographic location.

Figure 7:
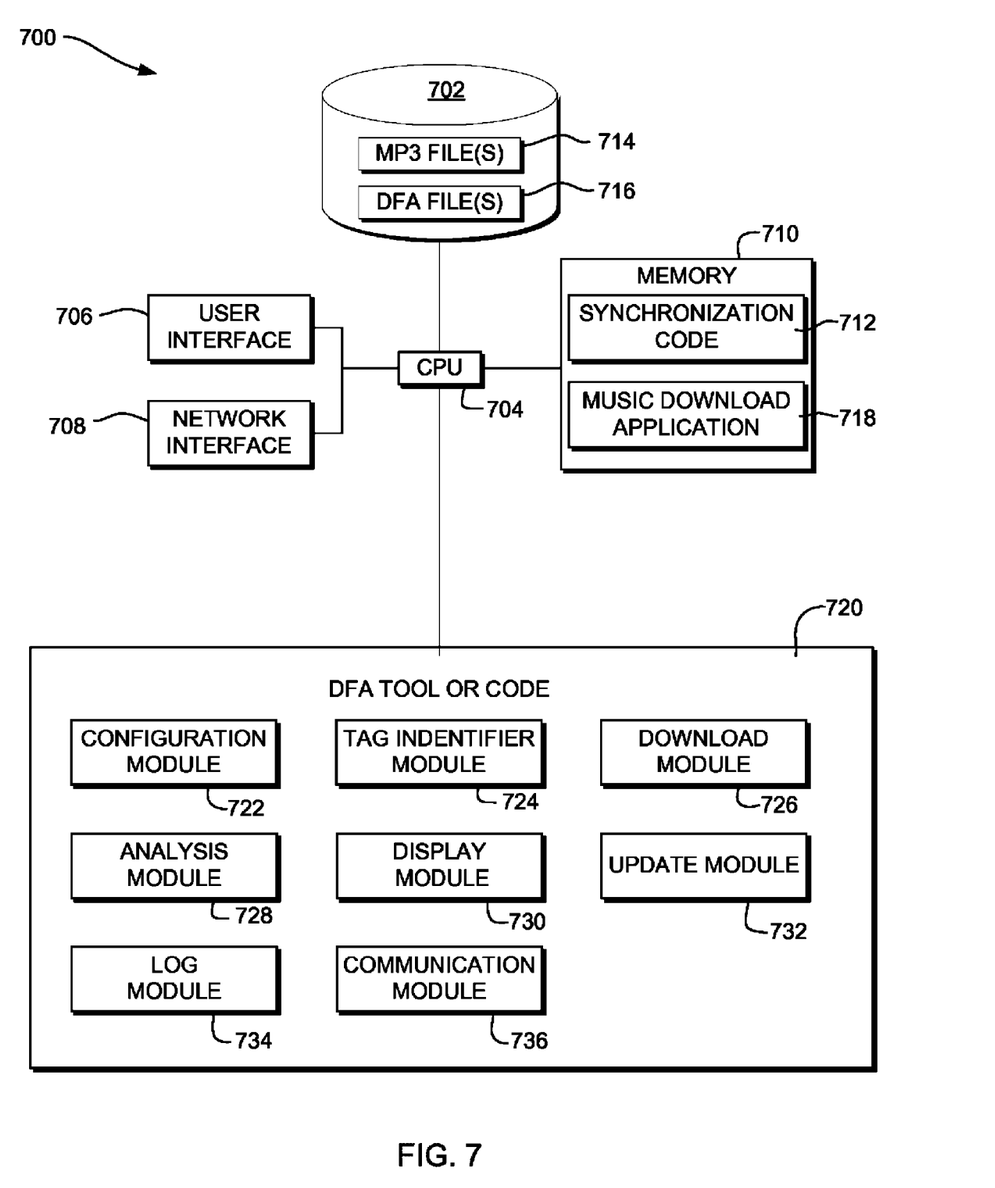
FIG. 7 is a schematic block system diagram illustrating an embodiment of a personal computer system for collecting and displaying advertising content on a display of a portable music player, in accordance with an embodiment of the invention.

In another embodiment, the invention provides a computer system for displaying advertising content on a portable music player, in accordance with an embodiment of the invention. In an embodiment, the computer system includes a computer program product that is loaded onto the computer system for displaying advertising content on a portable music player. Reference is now made to FIG. 7, reference numeral 700, which depicts a schematic block system diagram illustrating one embodiment of a computer system 700, such as, a standalone or personal computer or server that has installed thereon a computer program product, namely a Direct From Artist (DFA) tool or code 720 that is configured to display advertising content on a portable music player. Preferably, the system 700 is a computer system that includes a central processing unit (CPU) 704, a local storage device 702, a user interface 706, a network interface 708, and a memory 710. The CPU 704 is configured generally to execute operations within the system 700, such as, the music file synchronization code or program 712, the music download application 718 and the Direct From Artist (Direct From Artist) tool or code 720. The CPU 704 is configured generally to execute operations within the system 700, such as, the DFA tool or code and/or the music download application 718 and/or the music file synchronization code 712. The user interface 706 is configured, in one embodiment, to receive input from a user. The network interface 708 is configured, in one embodiment, to facilitate network communications of the system 700 over a communications channel of a network. In one embodiment, as shown in FIG. 7, the Direct From Artist (DFA) code or tool 720 comprises a logic unit that contains a plurality of modules configured to functionally execute the necessary steps of displaying advertising and other relevant content on a portable music player. In particular, the DFA code or tool 720 comprises a configuration module 722, a tag identifier module 724, a download module 726, an analysis module 728, a display module 730, an update module 732, a log module 734 and a communication module 736.

Referring to FIG. 7, the configuration module 722 of the DFA code or tool 720 configures a portable music player for displaying advertising and other related content retrieved from a DFA file pertaining to a music file that is downloaded onto the portable music player or a music file that is playing on the portable music player. The tag identifier module 724 determines if a respective URL is specified in a respective meta tag associated with a respective music file being downloaded. The download module 726 downloads, via a network connection, the one or more music or MP3 files and also downloads one or more DFA files containing advertising content and information relating to the music files being downloaded. In an embodiment, the MP3 files (reference numeral 714) and the DFA files (reference numeral 716) are stored in a storage 702 within computer system 700. The analysis module 728 analyzes data pertaining to the one or more music files stored on the portable music player. The display module 30 displays the advertising content on the display of a portable music player, such that, the advertising content displayed is tailored based on analysis of the data by the analysis module 728. The update module 732 updates the DFA files so that updated advertising information can be displayed on the portable music player. Further, the update module 732 synchronizes the DFA files stored on the computer system 700 with the DFA files stored on a portable music player. The log module 734 logs or records data pertaining to the one or more music files stored on the portable music player, such as, which track is played often, etc. The communication module 736 is configured to permit communication between the various modules of the DFA code or tool 720 and the other components, such as, the storage system or database 702, which stores the MP3 file(s) 714 and the DFA file(s) 716.

Figure 8:
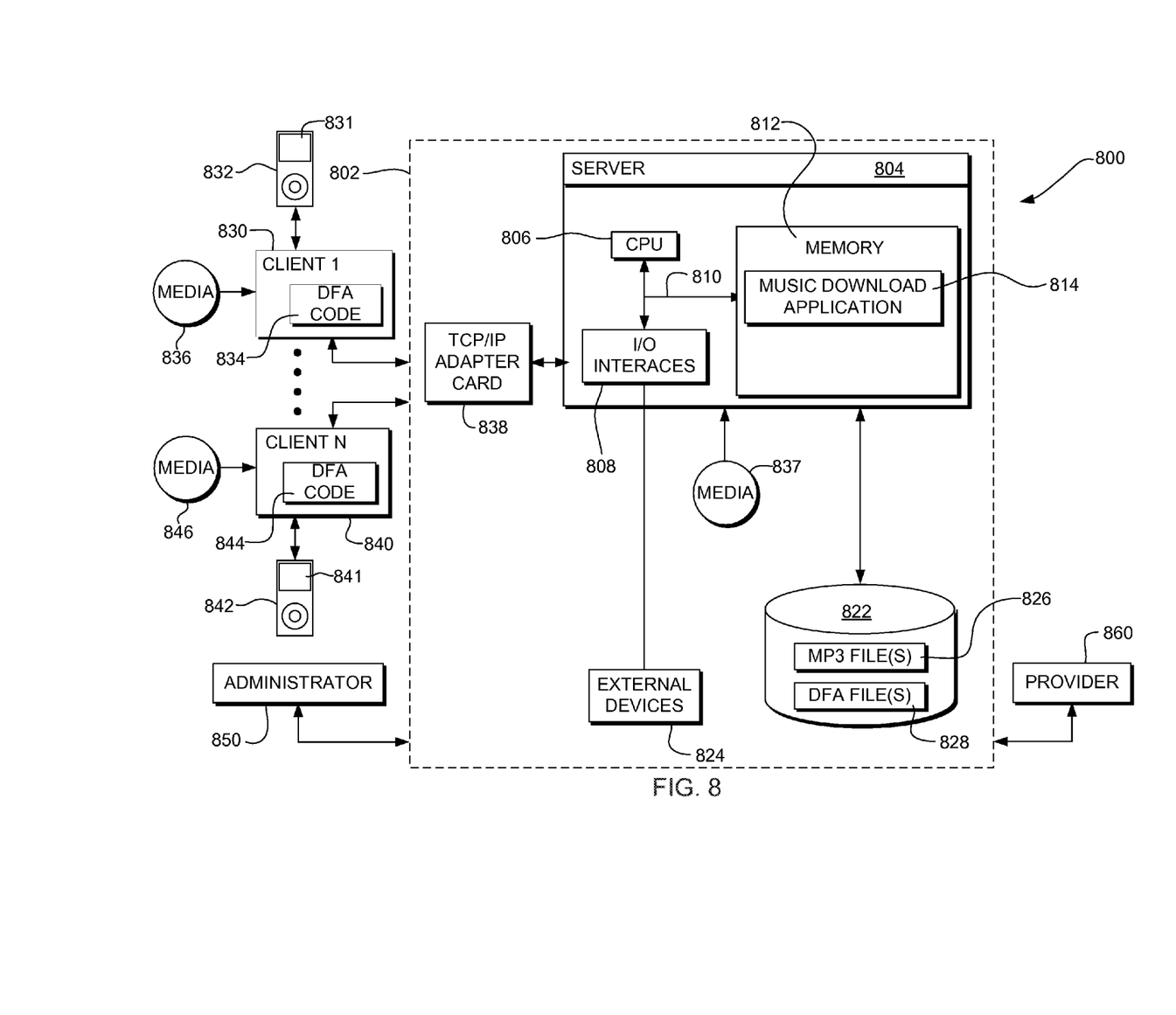
FIG. 8 is a schematic block system diagram illustrating an embodiment of a computer infrastructure for collecting and displaying advertising content on a display of a portable music player, in accordance with an embodiment of the invention.

Referring now to FIG. 8, there is illustrated a computer infrastructure 800 that includes a computer system or server computer 802 that has deployed thereon and runs a music download application 814 and where the server computer 802 is configured to serve one or more music files over a network, such as, the Internet, to one or more client computers 1 through N (reference numeral 830 through 840, respectively) requesting download of one or more music files, such as, one or more MP3 files, which in an embodiment, are stored in a storage system 822 coupled to the server 804. In an embodiment, each of the client computers 830 through 840 has installed thereon a computer program product that comprises a computer readable or computer-usable storage medium, which provides a program code, namely, the DFA code (reference numeral 834 through 844), which implements the invention. The DFA code or tool can be loaded onto each of the client computers (reference numeral 830 through 840, respectively) from a computer readable medium or media (reference numeral 836 through 846, respectively), such as, a magnetic tape or disk, optical media, DVD, memory stick, semiconductor memory, etc. or downloaded from the server via a TCP/IP adapter card (reference numerals 838) installed on the server 804. As depicted in FIG. 8, system 800 includes a computer infrastructure 802, which is intended to represent any type of computer architecture that is maintained in a secure environment (i.e., for which access control is enforced). Further, as shown, infrastructure 802 includes a computer system 804 that typically represents an application server or system 804 or the like that includes a music download application 814. It should be understood, however, that although not shown, other hardware and software components (e.g., additional computer systems, routers, firewalls, etc.) could be included in infrastructure 802.

In general, one or more client computers, for instance, client 1 (reference numeral 830) through client N (reference numeral 840) may access the server 804, which has deployed thereon the music download application 814 for serving one or more music files 826 to the respective client computers 830 through 840. Further, in an embodiment, the DFA code or tool (reference numerals 834 and 844) loaded onto each of the respective client computers (reference numerals 830 and 840, respectively) requests one or more MP3 files 826 and/or requests one or more Direct From Artist (DFA) files 828 associated with the MP3 files 826 being downloaded from a file storage system 822 of the server 804. Further, the DFA code (reference numeral 834 and 844) loaded onto each of the respective client computers displays the Direct From Artist (DFA) content downloaded on a respective display (reference numerals 831 and 841) of a respective portable music player (reference numeral 832 through 842), when a respective music file is playing, such that, the DFA content being displayed is either relevant to the respective music file playing on the respective portable music player or is relevant to another music file downloaded onto the respective portable music player.

As shown in FIG. 8, the computer system or server 804 (which has implemented thereon the music download application or program 814) is shown to include, in an embodiment, the music file(s) or MP3 file(s) 826 and the DFA files 828 that are stored in a storage system 822 within infrastructure 802. In particular, a user at a client computer (such as, client 1, reference numeral 830) accesses the music download application 814 running on system 804 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 802 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wireless Fidelity) or other conventional communications standards could be used. Still yet, connectivity could be provided by conventional TCP/IP sockets-based protocol. In this instance, the parties could utilize an Internet service provider to establish connectivity to infrastructure 802. It should be understood that under the invention, infrastructure 802 could be owned and/or operated by a party such as a service provider 860, or by an independent entity. Regardless, use of infrastructure 802 and the teachings described herein could be offered to the parties on a subscription or fee-basis. In either scenario, an administrator 850 could support and configure infrastructure 802, for instance, for upgrading the music download application 814. In an embodiment, the music download application 814 and/or the MP3 files and/or DFA files 828 may be downloaded onto server 804 utilizing media 838.

The computer system or server 804 is shown to include a CPU (hereinafter "processing unit 806"), a memory 812, a bus 810, and input/output (I/O) interfaces 808. Further, the computer system 804 is shown in communication with external I/O devices/resources 824 and storage system 822. In general, processing unit 806 executes computer program code, such as, the music download application 814. While executing computer program code, the processing unit 806 can read and/or write data to/from memory 812, storage system 822, and/or I/O interfaces 808. For instance, in one embodiment, the music download application 814 stores the MP3 file(s) 826 and the Direct From Artist (DFA) file(s) associated with the MP3 files 826 in storage 822. Alternatively, the data stored in storage 822 may be stored in a separate storage within the system 804. Bus 810 provides a communication link between each of the components in computer system 800, such that information can be communicated within the infrastructure 802. External devices 824 can comprise any devices (e.g., network card, modem, etc.) that enable server 804 to communicate with one or more other computing devices.

Computer infrastructure 802 is only illustrative of various types of computer infrastructures for implementing the invention. For example, in an embodiment shown, computer infrastructure 802 comprises two or more computing devices (e.g., a server cluster) that communicate over a network to perform the various process steps of the invention. Moreover, computer system 800 is only representative of various possible computer systems that can include numerous combinations of hardware. To this extent, in other embodiments, computer system 800 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 806 may comprise a single processing unit, or be distributed across one or more processing units in one or more locations, e.g., on a client and server. Similarly, memory 812 and/or storage system 822 can comprise any combination of various types of data storage and/or transmission media that reside at one or more physical locations. Further, I/O interfaces 808 can comprise any system for exchanging information with one or more external devices 824. Still further, it is understood that one or more additional components (e.g., system software, math co-processing unit, etc. not shown in FIG. 8) can be included in computer system 800. It is understood that one or more external devices 824 (e.g., a display) and/or storage system(s) 822 could be contained within computer system 804, and not externally as shown. Storage system 822 can be any type of system (e.g., a database) capable of providing storage for information under the invention, such as the files to be preprocessed by the music download application 814. To this extent, storage system 822 could include one or more storage devices, such as a magnetic disk drive or an optical disk drive. In another embodiment, storage system 822 includes data distributed across, for example, a local area network (LAN), wide area network (WAN) or a storage area network (SAN) (not shown). Although not shown, additional components, such as cache memory, communication systems, system software, etc., may be incorporated into computer system 800.

Accordingly, the invention provides a method, system and program product for collecting and displaying advertising or general related information on the display of a MP3 device or player in a manner, such that, the advertising content or information is related contextually to the audio selection currently playing on the device and/or which may be relevant based upon one or more of the audio selections stored on the device. As such, the advertising content or information may be useful to the owner of the player or device based on the device owner's specific preferences or listening habits. Further, the invention provides a way to use an MP3 device for the purpose of interactive marketing and research, advertising and/or performing business transactions.

The foregoing descriptions of specific embodiments of the invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of advertising on a portable music player, the method comprising the steps of:
    the portable music player identifying a plurality of music files currently stored on the portable music player by checking a library of music files currently stored on the portable music player;
    a programmed processor determining advertising content to be displayed on the portable music player based in part on identities of the plurality of music files identified by the portable music player from the library as currently stored on the portable music player; and
    the programmed processor initiating display of the advertising content on the portable music player.

2. The method of claim 1, wherein the programmed processor is part of the portable music player.

3. The method of claim 1, wherein the programmed processor initiates play of one of the plurality of music files concurrently with the display of the advertising content.

4. The method of claim 1, further comprising the prior step of downloading to the portable music player at least one music file that is not currently stored on the portable music player.

5. The method of claim 1 further comprising the step of:
    the portable music player receiving download of the plurality of music files prior to storage of the plurality of music files on the portable music player, a meta tag containing a Uniform Resource Locator ("URL") accompanying one of the plurality of music files, the URL identifying a web site containing advertisements, including the advertising content, available for display on the portable music player.

6. The method of claim 1, wherein the programmed processor determines the advertising content to be displayed on the portable music player based in part on one or more genres of the plurality of music files identified from the library as currently stored on the portable music player.

7. The method of claim 1, wherein the programmed processor determines the advertising content to be displayed on the portable music player based in part on one or more listening habits logged for a user of the portable music player pertaining to the plurality of music files identified from the library as currently stored on the portable music player.

8. The method of claim 1, wherein the programmed processor determines the advertising content to be displayed on the portable music player based in part on respective numbers of times that the plurality of music files identified from the library as currently stored on the portable music player have been played on the portable music player.

9. A computer program product for advertising on a portable music player, the computer program product comprising:
    one or more computer-readable tangible storage devices;
    program instructions, stored on one or more of the storage devices for execution in the portable music player, to identify a plurality of music files currently stored on the portable music player by checking a library of music files currently stored on the portable music player;
    program instructions, stored on one or more of the storage devices, to determine advertising content to be displayed on the portable music player based in part on identities of the plurality of music files identified by the program instructions, which execute in the portable music player, from the library as currently stored on the portable music player; and program instructions, stored on one or more of the storage devices, to initiate display of the advertising content on the portable music player.

10. The computer program product of claim 9, wherein the program instructions to determine the advertising content to be displayed on the portable music player determines the advertising content based in part on one or more genres of the plurality of music files identified from the library as currently stored on the portable music player.

11. The computer program product of claim 9, wherein the program instructions to determine the advertising content to be displayed on the portable music player determines the advertising content to be displayed on the portable music player based in part on one or more listening habits logged for a user of the portable music player pertaining to the plurality of music files identified from the library as currently stored on the portable music player.

12. The computer program product of claim 9, wherein the program instructions to determine the advertising content to be displayed on the portable music player determines the advertising content to be displayed on the portable music player based in part on respective numbers of times that the plurality of music files identified from the library as currently stored on the portable music player have been played on the portable music player.

13. The computer program product of claim 9 further comprising:

program instructions, stored on one of the storage devices for execution on the portable music player, to receive download of the plurality of music files prior to storage of the plurality of music files on the portable music player, a meta tag containing a Uniform Resource Locator ("URL") accompanying one of the plurality of music files, the URL identifying a web site containing advertisements, including the advertising content, available for display on the portable music player.

14. The computer program product of claim 9, wherein the program instructions to determine advertising content to be displayed on the portable music player execute on the portable music player.

15. A computer system for advertising on a portable music player, the computer system comprising:

one or more processors, one or more computer-readable tangible memories, and one or more computer-readable tangible storage devices;

program instructions, stored in the portable music player on one or more of the storage devices for execution in the portable music player by one or more of the processors via one or more of the memories, to identify a plurality of music files currently stored on the portable music player by checking a library of music files currently stored on the portable music player;

program instructions, stored on one or more of the storage devices for execution by one or more of the processors via one or more of the memories, to determine advertising content to be displayed on the portable music player based in part on identities of the plurality of music files identified by the program instructions, which execute in the portable music player, from the library as currently stored on the portable music player; and program instructions, stored on one or more of the storage devices for execution by one or more of the processors via one or more of the memories, to initiate display of the advertising content on the portable music player.

16. The computer system of claim 15, wherein the program instructions to determine the advertising content to be displayed on the portable music player determines the advertising content based in part on one or more genres of the plurality of music files identified from the library as currently stored on the portable music player.

17. The computer system of claim 15, wherein the program instructions to determine the advertising content to be displayed on the portable music player determines the advertising content to be displayed on the portable music player based in part on one or more listening habits logged for a user of the portable music player pertaining to the plurality of music files identified from the library as currently stored on the portable music player.

18. The computer system of claim 15, wherein the program instructions to determine the advertising content to be displayed on the portable music player determines the advertising content to be displayed on the portable music player based in part on respective numbers of times that the plurality of music files identified from the library as currently stored on the portable music player have been played on the portable music player.

19. The computer system of claim 15 further comprising:

program instructions, stored in the portable music player on one or more of the storage devices for execution in the portable music player by one or more of the processors via one or more of the memories, to receive download of the plurality of music files prior to storage of the plurality of music files on the portable music player, a meta tag containing a Uniform Resource Locator ("URL") accompanying one of the plurality of music files, the URL identifying a web site containing advertisements, including the advertising content, available for display on the portable music player.

20. The computer system of claim 15, wherein the program instructions to determine advertising content to be displayed on the portable music player execute on the portable music player.

* * * * *